Oct. 22, 1963
M. C. HIX
3,107,684
IRRIGATION SYSTEM EMPLOYING FLEXIBLE CONDUITS
Filed May 21, 1959
2 Sheets-Sheet 1
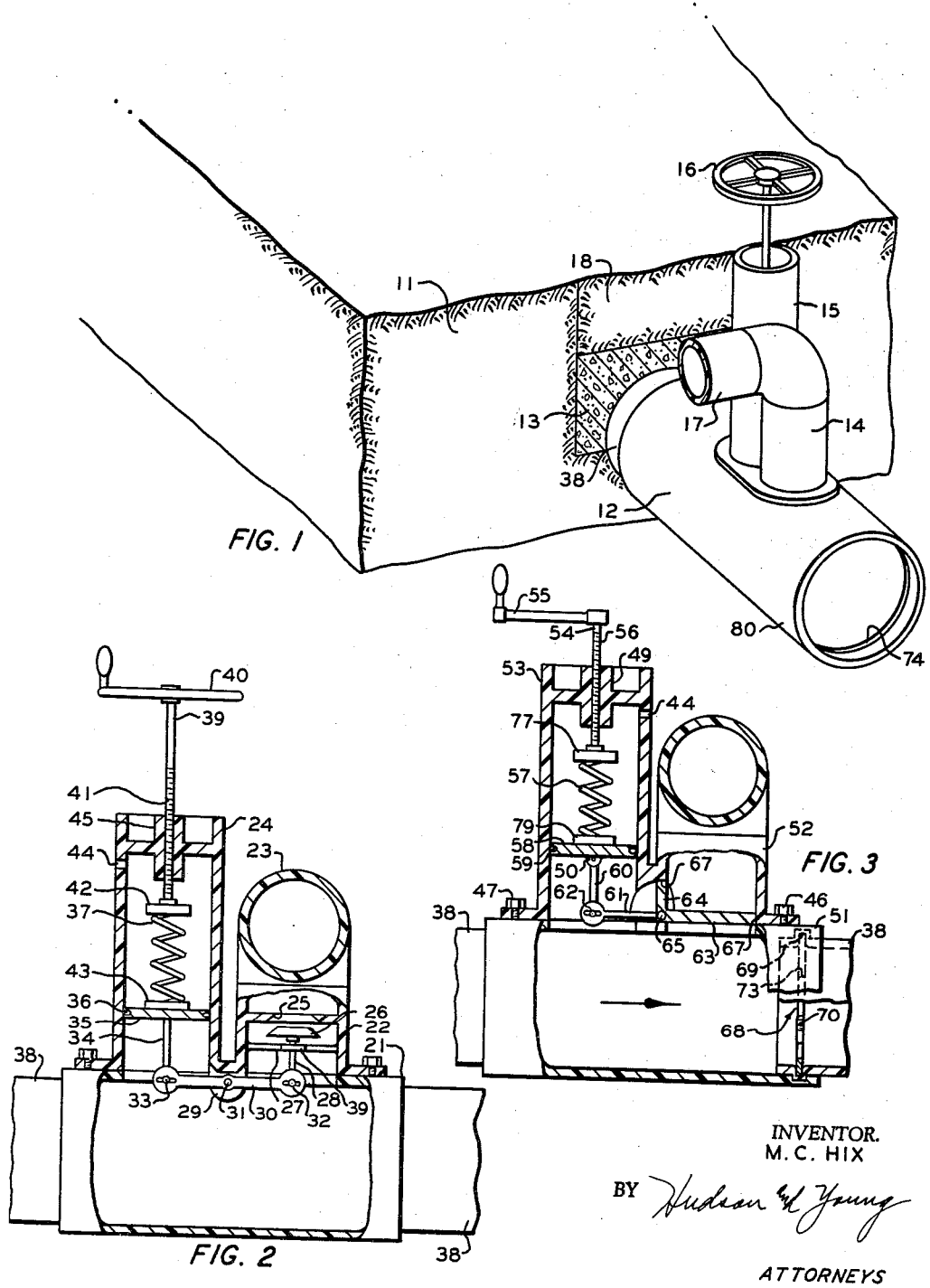
INVENTOR.
M. C. HIX
BY *Hudson W. Young*
ATTORNEYS Oct. 22, 1963 M. C. HIX 3,107,684
IRRIGATION SYSTEM EMPLOYING FLEXIBLE CONDUITS
Filed May 21, 1959 2 Sheets-Sheet 2

INVENTOR.
M.C. HIX
BY Hudson & Young
ATTORNEYS

United States Patent Office 3,107,684
Patented Oct. 22, 1963

3,107,684
IRRIGATION SYSTEM EMPLOYING FLEXIBLE CONDUITS
Marvin C. Hix, Dumas, Tex., assignor to Phillips Petroleum Company, a corporation of Delaware
Filed May 21, 1959, Ser. No. 814,785
6 Claims. (Cl. 137—236)

This invention relates to irrigation systems. In one aspect it relates to an agricultural irrigation system in which evaporation and capillary losses are eliminated.

In agricultural areas in which irrigation water is transported in open ditches, water losses in transit are appreciable. As is well known, some irrigation ditches are many miles in length and it is obvious that in such transport of water additional large volumes are lost by capillarity, that is, by soaking into the soil. In one instance in the Texas Panhandle, water loss by evaporation was approximately 20 percent of the water entering the irrigation ditch. Irrigation ordinarily is carried out in arid or semiarid regions in which atmospheric relative humidity is ordinarily very low. Under such conditions large evaporation losses result. The loss of water in transit through open ditches by soaking into the soil is evidenced by the voluminous growth of vegetation along the banks of ditches.

An object of this invention is to provide an irrigation system which is free from water loss by evaporation and by capillary movement into the soil. Another object of this invention is to provide such an irrigation system which is less expensive to construct and to maintain than conventional systems which use ordinary large diameter pipes. Still other objects and advantages will be realized upon reading the following disclosure which, taken with the attached drawing, forms a part of this specification.

According to this invention, an underground irrigation system is provided which is less expensive to install and to maintain than conventional underground irrigation systems. Applicant provides a flexible, plastic conduit or tubing of suitable diameter and by placing this tubing in a trench having a rounded bottom and filling the tube with water, the tubing is inflated to its normal shape. While in this condition a supporting material, either prepared in place or prefabricated, is placed in the trench over the inflated tubing. If the supporting material is prepared in place, sufficient time is allowed for the material to set and harden. After sufficient supporting strength is provided, the trench is filled with earth and that portion of the system is ready for operation. In case prefabricated arch-shaped support members are used, they are placed on top of the inflated tubing and then the trenches are filled with earth. Special outlet valves and risers, for withdrawing water from the buried conduit are provided.

In the drawing FIGURE 1 illustrates, in diagrammatic form, a section of earth in which is disposed a conduit with riser apparatus of this invention.

FIGURE 2 is an elevational view, partly in section, of an outlet valve assembly.

FIGURE 3 is an elevational view, partly in section, of another embodiment of outlet valve assembly.

Figure 4:
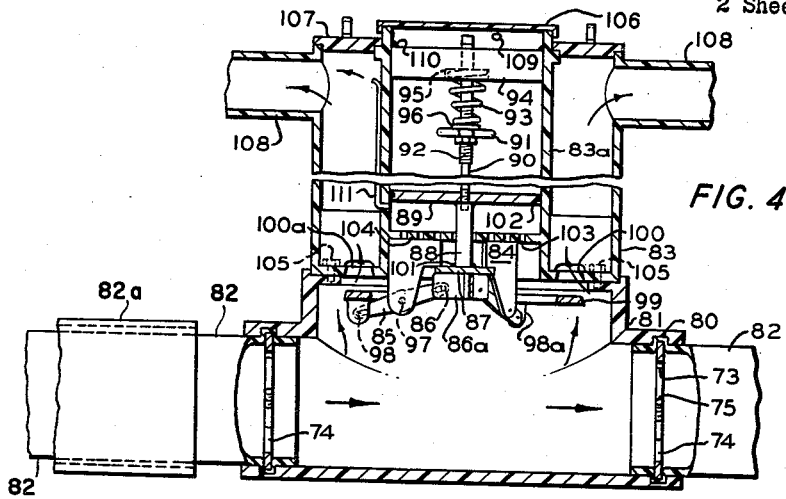
FIGURE 4 is an elevational view, partly in section, of still another embodiment of outlet valve.

In FIGURE 1 of the drawing, reference numeral 11 identifies a section of earth carrying an irrigation conduit of this invention. A flexible conduit or tubing 38 is illustrated as extending into the lower portion of a trench. Attached to the end of a flexible plastic tubing 38 is a riser housing 12 constructed of rigid material. Immediately above the flexible tubing 38 is disposed a precast arch-shaped soil supporting member 13. Immediately above the soil supporting member 13, the trench is filled with soil 18 which ordinarily is the same soil as was removed during excavation of the trench. Disposed upward from riser housing 12 is a riser member 14 to which is attached a conduit 17 as a water outlet. Reference numeral 15 identifies, for the most part, a cylinder in which is disposed a piston, as subsequently described, and other apparatus for use in conjunction with a hand wheel 16 of FIGURE 1, or with a crank 55 of FIGURE 3, for opening and for closing of the water outlet valve. This water outlet valve assembly in various embodiments is illustrated in FIGURES 2, 3 and 4.

In FIGURE 2, reference numeral 21 is a housing which corresponds to housing 12 of FIGURE 1. Reference numeral 22 corresponds to riser 14 of FIGURE 1 and cylinder 24 corresponds to cylinder 15 of FIGURE 1. In riser housing 22 is disposed a valve seat 25 which is shaped to receive a poppet-type valve 26 from below. Valve 26 is supported on a valve stem 28 which is guided by a guide web 27. The lower end of valve stem 28 is pivoted by a pivot 32 to a pivot arm 30, itself being pivoted at 31 to a portion of the housing 21 between riser housing 22 and cylinder 24. The pivot arm 30 extends to a pivot 33 which supports a piston rod 34. At the upper end of rod 34 is a slidable piston 35 provided with an O-ring seal 36. Fxed to the upper side of piston 35 is a fixed spring retainer 43 to which is attached a compression spring 37 which, in turn, is attached to a rod 39 by a pivot spring retainer 42. Rod 39 is threaded at 41 into a support 45, as illustrated. At the upper end of rod 39 is a valve wheel 40 provided for the manual adjustment of the compression of spring 37. Reference numeral 29 identifies a pivot support web which is a portion of housing 21 between riser housing 22 and cylinder 24 to which pivot arm 30 is pivoted. A vent 44 is provided in the wall of cylinder 24 so that, in case of leakage of liquid around piston 35, pressure will not develop in the cylinder.

This valve is intended to operate in the following manner. As constructed, the area of piston 35 is greater than the effective area of valve 26 so that upon exposure to fluid pressure from within housing 21, the piston 35 will tend to rise and open valve 26 from its seat 25. Hand wheel 40 is rotated so as to adjust the compression of spring 37 for permitting piston 35 to rise thereby opening valve 26 when water is desired to be withdrawn from tubing 23 and housing 21 for irrigation purposes. Water, on flowing through valve seat 25, leaves this valve assembly through water outlet 23 for passage to the land to be irrigated. The spring is intended to allow opening of the valve by hand wheel 40 when a maximum operating pressure of about 14 pounds per square inch gauge of water is in the conduit. The spring is also selected of such strength that if the pressure of the water in the underground system decreases to a value of about 6 or 7 pounds, the differential force tending to move piston 35 upward is decreased and the spring thereby forces the piston downward closing valve 26 against its seat thereby preventing outflow of water. In this manner at least some pressure is always maintained in the flexible water-carrying tubing 38 so that this flexible tubing will not ever be exposed to a pressure less than atmospheric. Under such a condition the flexible tubing would be subject to collapse.

In FIGURE 3, the principle of operation of this embodiment of apparatus is, in general, similar to that of FIGURE 2 even though the structure of the valve is somewhat different. In this embodiment a riser housing 52 and a cylinder 53 are provided. A piston 58 is provided with an O-ring seal 59 and a fixed spring guide 79 into which a compression spring 57 is fixed. A crank 55 is attached to a rod 54 threaded at 56, the threaded section passing through a corresponding threaded support 49. At the bottom end of rod 54 is attached a pivoted spring retainer 77 which is so constructed that upon rotating rod 54 spring 57 does not rotate, but is compressed or expanded. A piston rod 60 is pivoted at 58 to the underside of the piston. The lower end of rod 60 is pivoted at 62 to one end of a pivot arm 61, a flapper valve 63 being attached rigidly to the other end. The flapper valve 63-pivot arm 61 is pivoted at 65. Attached to the flapper valve 63 and pivot arm 61 at approximately pivot 65 is an upward extending auxiliary pressure sensing member 64. As pivot 62 moves downward, pivot arm 61, pressure sensing member 64 and the flapper valve 63 rotate in a counterclockwise direction and upon raising pivot 62 upward, these several members move in the opposite or clockwise direction. Riser housing 52 and the cylinder 53 in the vicinity of pivot 65 terminate a short distance above pivot 65 in the form of a circular arc in such a manner as to permit seating of the pressure sensing member 64 in any position reached during its normal rotation. Reference numeral 67 is intended to identify this seat against which the pressure sensing member 64 bears in making a reasonably tight seal.

Figures 5, 6, 7:
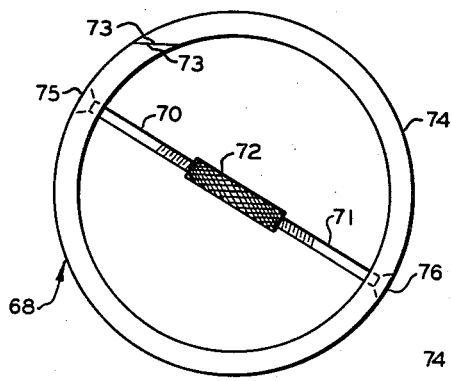
FIGURE 5 is a view of a ring used in attaching the flexible tubing to the rigid valve assembly.
FIGURE 6 is a view of the same ring as illustrated in FIGURE 5 in a contracted form ready for installation.
FIGURE 7 is a cross sectional view taken on the line 7—7 of FIGURE 6.

In FIGURE 3 is illustrated a means for attaching flexible tubing 38 to the rigid housing 51. This means is identified in the figure by reference numeral 68. A ring 74 (FIGURE 5) of this assembly is more or less like a conventional piston ring the ends of which are beveled at 73. A threaded rod 70 is illustrated in part in FIGURE 3 and in detail in FIGURE 5. The ring of this connecting means is seated in a groove 69 in the inner wall of housing 51. Since the tubing 38 is quite flexible, the ring 74, FIGURE 5, is contacted so that its effective diameter is less than the diameter of the inner wall of housing 51. The ring is then placed in position and expanded into the groove 69 thereby pressing the flexible tubing 38 tightly into the groove 69. In this manner a suitable connection is made between the flexible tubing 38 and the rigid housing 51.

In the operation of the valve assembly of FIGURE 3 the area of the piston 58 is the same as the area of the flapper valve 63 and any pressure of fluid in the housing 51 exerts the same force against the underside of piston 58 as against the underside of valve 63. The left-hand surface of the auxiliary pressure sensing member 64 tends to move from left to right while pressure exerted on the bottom surface of valve 63 tends to move this valve upward and in an opposite direction to that of the sensing member 64 around pivot 65. Since the piston and the valve have equal surfaces, the surface of the sensing member 64 then throws this valve assembly off balance and this off balance is adjusted by compression spring 57. The compression spring is so selected that upon exertion of a relatively high pressure, for example, about 14 pounds per square inch gauge in the housing 51, the force exerted against the pressure sensing member 64 is equal to the downward force of compression spring 57 and the valve remains closed. Upon threading rod 54 upward and decreasing the downward bias of spring 57, the piston 58 is moved upward thereby opening valve 63 to the flow of water. If the pressure of the water in housing 51 decreases to a value of, for example, 6 p.s.i.g., the force acting from right to left against the auxiliary pressure sensing member 64 decreases thereby allowing compression spring 57 to move piston 58 downward which movement closes valve 63. In this manner, when withdrawing water from the system, if, for any reason whatever, the pressure in the system drops to a value 6 or 7 pounds above atmospheric pressure, the valve will close so that water cannot continue to flow out of the system and possibly reduce the pressure in the flexible conduit 38 to a pressure below atmospheric. In this manner the flexible tubing is maintained in an expanded condition and is not allowed to collapse.

In FIGURE 4 is illustrated still another embodiment of the water outlet valve of my invention. In this figure reference numeral 81 identifies a housing into the end of which a flexible tubing such as a flexible plastic tubing 82 is attached. Tubing 82 is attached to housing 81 in a manner similar to that mentioned hereinbefore in the explanation of FIGURE 3. Ring 74 is expanded into a groove 80 and upon meeting of beveled surfaces 73 as the ring expands, tight contact between the tubing 82 and the housing 81 is attained. The principle of construction and operation of this embodiment is similar to that of FIGURES 2 and 3; however, details of construction are somewhat different. In this embodiment a riser housing 83 is disposed concentrically around a cylinder 83a. Within the cylinder 83a is disposed a piston 89 provided with an O-ring seal 102. Into the top of piston 89 is threaded a rod 90. A section of rod 90 is threaded at 92 for accommodation of a wingnut 91 on the top of which is fixed a spring guide 96. Attached to the upper surface of spring guide 96 is a compression spring 93, the top end of the spring being fixed to a support member 95 firmly attached to a web 94. The lower spring guide 96 is attached to spring 93 in such a manner that the spring may rotate in the spring guide 96, yet the end of the spring cannot be moved away from the guide. The web 94 is held firmly in position in the upper portion of cylinder 83a by welds 110. A vent 109 is provided for pressure relief in case fluid leaks from below piston 89.

To the bottom side of piston 89 is attached a piston rod 88. A stop plate 87 is welded at 101 to the lower end of rod 88. Three webs 86a spaced 120 degrees apart extend downward from plate 87, as illustrated. To the three webs are pivoted pivot arms 85 at pivots 86. Pivot arms 85 are also pivoted at 97 to web 84, these latter webs being attached to the plate 104 provided with a plurality of openings 103. Plate 104 is intended to serve as a guide for the lower end of rod 88. The ends of the several pivot arms 85 are pivoted at 98 to support member 98a to the top of which is rigidly fixed an annular valve member 99. The three pivot arms 85 thereby provide a three-point suspension for the annular valve member 99 so that upon seating it can be held tightly against its seat. The seat for this annular valve is actually two concentric beveled surfaces 100. These beveled surfaces define an annular opening 100a which is actually the valve opening through which water flows. Bolts 105 are provided for fastening the riser housing 83-cylinder 83a portion of this apparatus to the main housing 81. A cap 106 closes the upper end of cylinder 83a while an annular cap 107 closes the upper annular end of the riser housing 83.

The valve assembly as illustrated in FIGURE 4 is intended for outlet of relatively large volumes of water and, as intended, two or more outlets 108 are provided.

In this case the area of piston 89 is greater than the effective area of the annular valve 99. Spring 93 is adjusted by removing cap 106 and extending the hand downward in the cylinder on one side of web 94 and turning wingnut 91. By turning wingnut 91, the spring is compressed or released which tends to raise or lower piston 89 thereby opening or closing valve 99 from or to its seat. Since the effective surface of valve 99 is less than the surface area of piston 89, in case water is not desired to be withdrawn from this valve, wingnut 91 is threaded upward on rod 90 and valve 99 seats against its seat. When water is desired to be flowed from outlets 103, wingnut 91 is threaded downward which then allows the greater force exerted by the water on the underside of piston 89, than on the underside of valve 99, to open the valve. If pressure in the system drops to a low pressure of 6 or 7 p.s.i.g., piston 89 is lowered by the expansive force of spring 93 thereby raising valve 99 and closing it against its seat so that sufficient water cannot be allowed to flow through outlets 103 to cause a reduction of pressure in the conduit 82 to a value below atmospheric. Tube 111 is provided, as illustrated, for venting of air from the space below piston 89 in case air bubbles accumulate below piston 89. When valve 99 is closed, piston 89 and O-ring seal 102 are below the outlet of tube 111 so there is not leakage of water.

As mentioned hereinbefore, when the plastic tubing 38 is installed in a conduit, ring 68, as illustrated in FIGURES 3, 5, 6 and 7, or a modification thereof, is employed. Since the end of tubing 38 extends into housing 51, as in FIGURE 3, a means is provided inside of the tubing 38 and housing 51 for holding the tubing in close contact with the housing so that when pressure is applied within the conduit system, leakage will not occur at this joint. An expansible ring assembly 68 was briefly described as being a means suitable for attachment of plastic conduit 38 to the rigid housing 51. FIGURES 5, 6 and 7 illustrate in detail the construction and operation of such an expansible ring assembly. Flexible ring 74 is constructed, in general, in the same manner as an ordinary piston ring. It may be made of metal, if rust proof. The ring is provided with beveled ends 73. In this manner one end of ring 74 can be pulled inward toward the center of the circle defined by the ring and away from the other end of the ring. In this manner the effective diameter of the ring is shortened and a ring having this configuration can then be slipped into place through such an opening as provided in housing 51 when bolts 46 and 47 are removed and the riser 52 and cylinder 53 are removed. After the ring is slipped into place and expanded in groove 69, the riser 52 and cylinder 53 assembly is again bolted in place. In FIGURE 4 access is attained to the space inside of housing 81 for insertion of the rings for holding plastic tubing 82 tightly against the inner groove 80 in the inner wall of housing 81 by lifting annular cap 107 and removing bolts 105. This entire superstructure, loosened by removal of bolts 105, can then be removed so that the rings can be slipped into place.

As a means for holding the rings in their configuration of shortened diameters, as hereinbefore mentioned, a turnbuckle arrangement can be used. Such an arrangement is illustrated in FIGURES 5 and 6. A pair of openings 75 and 76 are drilled through opposite sides of ring 74 with the outer ends being counter drilled. One of the openings is positioned rather close to the beveled end 73, as shown in these figures. Through opening 75 is inserted a threaded rod 70 and through opening 76 is inserted another threaded rod 71. These rods have heads fitting the counter drilled portions of openings 75 and 76. One of these rods is threaded with left-hand threads while the other is provided with right-hand threads. One of the rods 75 or 76 is moved axially through its opening away from the other rod a short distance and a turnbuckle sleeve 72 slipped into place between the threaded ends of these rods. Upon rotating this turnbuckle sleeve in the proper direction, it advances onto both of the rods. Upon further turning of the turnbuckle sleeve, the end of the ring closest to beveled edge 73 is drawn inward. When this end of the ring is drawn inward sufficiently, the diameter of ring 74 is smaller than the inner diameter of housing 51 or housing 81, and the ring can be slipped into the groove. Then, upon turning the turnbuckle sleeve in the opposite direction, ring 74 expands to its normal circular configuration in groove 69, or groove 80, as the case may be. However, in this case rods 70 and 71 and the turnbuckle sleeve 72 remain in the conduit. FIGURE 6 illustrates the ring assembly of FIGURE 5 with the one end of the ring being drawn inward to provide the ring with the aforementioned smaller diameter suitable for installing in the pipe. FIGURE 7 is a sectional view of the ring taken on the line 7—7 of FIGURE 6 and shows the rounded edges of the ring which contact the plastic tubing. These edges are rounded so that when the ring is expanded to hold the plastic tubing in the groove, the tubing will not be cut or injured by the ring.

Figure 8:
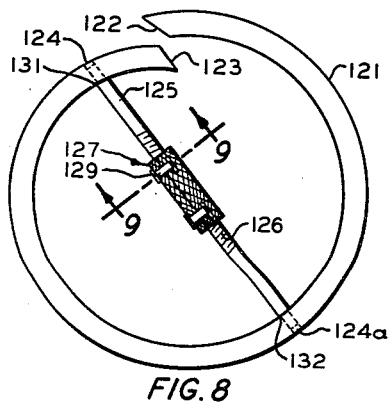
FIGURE 8 is a view of a ring more or less similar to that of FIGURES 5 and 6 employing an alternate form of turnbuckle.
Figure 9:
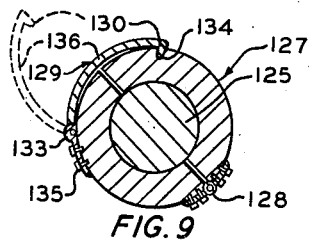
FIGURE 9 is a sectional view taken on the line 9—9 of FIGURE 8.

FIGURES 8 and 9 illustrate a different embodiment of turnbuckle assembly for installing a ring in the plastic tubing with the turnbuckle assembly being removable after assembly. In this case ring 121 is similar to ring 74 of FIGURE 5. Threaded holes 124 and 124a are provided, as illustrated. These holes are threaded with right-hand threads. Threaded into these holes are rods 125 and 126, as shown. The ends of rods 125 and 126 near the center of the ring are threaded respectively with right-hand threads and left-hand threads. The opposite ends of these rods are threaded in conformance with the threads in holes 124 and 124a. The ends of rods 125 and 126 are provided respectively with shoulders 131 and 132 so that the rods can be threaded into holes 124 and 124a and held tightly therein. When these rods are threaded into place in holes 124 and 124a a split turnbuckle sleeve provided with left-hand threads on one end and right-hand threads on the other is snapped in place over the adjacent ends of the rods. Then, on rotating the turnbuckle, the end 123 of ring 121 is drawn inward and the ring is ready for installation. FIGURE 9 is a cross sectional view of this split turnbuckle sleeve showing its construction in detail. The split turnbuckle sleeve is composed of two halves hinged together by a hinge 128, as shown. At the opposite side of the sleeve is attached a hinged snap fastener 129, as illustrated. Reference numeral 133 identifies the hinge of this hinged fastener. A slot 134 is provided in the outer surface of the half of the split sleeve opposite from that to which the snap fastener is attached by bolts 135. A catch 130 is provided for mating with slot 134. Member 136 is a small spring steel strap, one end of which is attached to hinge 133 and the other end being catch 130. When catch 130 snaps into slot 134, the split turnbuckle is in its operative position. To open the turnbuckle, it is merely necessary to push the middle portion of the spring steel strap 136 inward toward the turnbuckle and pull the catch 130 outward. By using the turnbuckle assembly illustrated in FIGURES 8 and 9, it is possible to use this assembly to install the ring 121 and then to remove the entire turnbuckle assembly, leaving the entire cross section of the conduit unobstructed for the free flow of water.

The rings of 74 and 121 are preferably made of suitably rust resistant metal, or a metal coated with a suitable rust resistant coating, such as a galvanized ring. Rings of a plastic material, as hereinafter described, can be used.

The hereinbefore mentioned soil cement preformed support arch members can be made according to "Essentials of Soil-Cement," copyright 1958, by the Portland Cement Association. This soil-cement is merely a composition made by mixing approximately 75 percent soil with 25 percent Portland cement. Upon moistening this mixture with water, the cement sets, thereby solidifying the entire composition. The preformed arch members may be formed in molds at a central location or may be produced at the point of use along a trench in which the irrigation apparatus of this invention is installed.

Another embodiment of support for protecting the upper surface of plastic conduits 38 and 82 against collapse is as follows. Install the housings with risers and the plastic tubing in a suitable trench. After their installation, fill the entire conduit with water under a few pounds' pressure. Then gently place on top of the plastic tubing properly moistened mixtures of soil-cement composition and allow the mixtures to set. After setting and some hardening of the cement-containing composition, the trench may be filled with earth and the system is ready for use.

Other soil hardening agents can be used, if desired, by mixing the agents with proper proportions of soil and adding a material such as water thereby causing the material to set and to harden, thereby forming a support sufficiently rigid for the use at hand. Such a soil support as this latter one may be made as a preformed member or may be made in place, as mentioned relative to the soil-cement composition.

The plastic tubing as used herein, and one which is preferred, is a polyethylene tubing having a wall thickness of about 1/16 of an inch. Such a flexible polyethylene tubing easily carries the weight of the water in transit and can absorb shock and surge of the water by flexing. The film is easily deformed to match slight irregularities of the channel walls surrounding the tubing. A suitable polyethylene for construction of a tubing for this purpose has a molecular weight in the range of 25,000 to 200,000 or higher, a density of from 0.940 to 0.980 gram per cubic centimeter and a crystallinity of at least 90 percent. A full description of the method for preparation of this plastic material is given in U.S. Patent 2,825,721. Briefly, this process involves polymerizing ethylene at a polymerization temperature in the range of 100° to 500° F., with a catalyst active for such polymerization and comprising chromium oxide supported on at least one material selected from the group consisting of silica, alumina, zirconia and thoria, at least part of the chromium being in the hexavalent state at the initial contacting of hydrocarbon with said catalyst, and recovering a resulting solid polymer. After production of the solid polyethylene, the rings, bearings and any other apparatus parts desired to be made of this material are extrusion molded into the proper shapes.

As stated, the density of this polyethylene material is between about 0.940 and 0.980 gram per cubic centimeter and the density is ordinarily determined on a sample of the mass polyethylene in non-filamentary form. The sample is prepared for the determination of density by compression molding of the polyethylene at a temperature of 340° F. in a mold provided with a water jacket through which water can be circulated. The sample is maintained at about 340° F. until it is completely molded. It is then cooled from 340° to 200° F. at the rate of approximately 10 fahrenheit degrees per minute. Water is then circulated through the mold to continue the cooling to 150° F., the rate not exceeding 20 fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles on its surface. The small sample is placed in a 50 ml. glass stoppered graduate from separate burettes in such proportions that the sample is suspended in the mixed solution, i.e., it neither floats nor sinks. The graduate is shaken during the addition of the liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of a solid polyethylene. The polyethylene is then removed from the liquid and a portion of the liquid mixture of carbon tetrachloride and methylcyclohexane is transferred to a Westphal balance and the specific gravity of the liquid is measured at a temperature in the range of 73° to 78° F. This specific gravity is equal to the specific gravity of the polyethylene. For most practical purposes, the specific gravity is considered identical to the density. However, if a precise conversion to actual density units, grams per cubic centimeter, is desired, this is readily referable to water at 4° F. by calculations which will readily be evident to those skilled in the art. The precision of a single specific gravity determination is ordinarily within ±.0002. The molecular weight is determined by measuring the time required for a filtered solution of 0.1000 gram of the polyethylene in 50 ml. of tetralin (measured at room temperature, that is, about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_W = \frac{K 2.303 \log V_r}{C}$$

where K equals 24,450, C equals 0.183, $V_r$ equals time, in seconds, required for solution to run through the viscosimeter divided by the corresponding time required the polymer-free tetralin, both at 130° C. A single determination of molecular weight originally has a precision of ±1,000 molecular weight units.

The crystallinity of this polyethylene is determined by nuclear magnetic resonance. The percentage crystallinity represents the percentage by weight of the total polymer which is crystalline rather than amorphous.

Other polyolefins suitable for production of the flexible tubing herein disclosed possess densities of about 0.90 to 0.92, crystallinities of at least about 80 percent, and molecular weights in the range of about 25,000 to 200,000. A method for preparation of polyolefin plastic material is given in Belgian Patents 533,362 and 538,782.

In case a section of the plastic tubing might become damaged and leaky, installation of a new section of tubing is not a particularly difficult operation. All that is necessary is to excavate around a riser along the conduit such that the riser and associated parts can be unbolted and removed without allowing soil to fall into the open conduit. Upon removing the risers from the ends of the injured section of tubing, remove the rings which hold the tubing ends in the housings corresponding to housing 51. One end of a new section of tubing can be tied to one end of the old section of tubing through one housing and upon pulling the old section of tubing out through the other housing, the new tubing will follow. When completely inserted in the conduit, the rings holding the new section of tubing in place are inserted, the risers bolted back in place and the assembly is ready for operation. Another method of threading a new tubing into place is to fold the new tubing longitudinally into a form having a relatively small cross section. Then, upon filling the conduit about half full of water, the new section of tubing can be fed into one housing and floated in the direction of the flowing water toward the other housing. When the leading end of the new section of tubing reaches the distant housing, the tubing can be unfolded at the ends and fastened into place by the rings. The tubing is then ready for inflation by merely flowing water therethrough. Still another method for threading of the tubing through the conduit is to attach a wooden float to the leading end of the tubing and to carry this float and the tubing through the conduit with flowing water.

The tubing sections of most any suitable length can be used. For example, sections can be 100 to 300 feet in length. One point to consider in such an irrigation system is the water takeoff intervals required, that is, the tubing lengths can be chosen so as to use a single length of tubing between takeoffs.

I find that when a support material, such as the soil-cement composition, is employed over a polyethylene tubing about 2 feet below ground level, and the remainder of the trench filled with soil and properly packed, ordinary farm equipment can cross the trench without damage to the irrigation system.

Other means than a spring loaded piston can be used for regulation of opening and closing of the valves of this invention, for example, a diaphragm, spring loaded, or loaded with weights. The piston as hereindisclosed can likewise be loaded with weights in place of the spring. By adjusting the number or size of the weights, the opening of the valve is regulated in a manner analogous to adjusting the compression or tension of the spring.

While the rings 74 and 121 are disclosed as being made of metal, they can also be made of polyethylene, such as that hereinbefore described.

In the case of an already existing and old underground irrigation system in which the water carrying pipe is rusted and permits water loss by leakage into the soil, valve outlet assemblies as illustrated in FIGURES 2, 3 and 4 are used at such locations as it is desired to withdraw water. The leaky underground pipe is flushed free of silt, sand and other foreign material. A flexible plastic tubing, as tubing 38 or tubing 82, is threaded through the old piping 82a in a manner hereinbefore described for replacing an old section of tubing with a new section of tubing.

An important advantage in the use of the plastic liners of this invention is that they are resistant to chemical corrosion and oxidation. Accordingly, chemicals and fertilizers can be applied to the soil being irrigated merely by dissolving in the irrigation water without danger of pipe corrosion. Upon applying fertilizers, etc., in this manner, need for expensive distribution equipment is greatly reduced.

While certain embodiments of the invention have been described for illustrative purposes, the invention obviously is not limited thereto.

I claim:

1. An irrigation conduit system comprising, in combination, a rigid housing having a first conduit therethrough of generally circular cross section, a collapsible second conduit of about the same circular cross section as said first conduit, means attaching one end of said second conduit to the wall of said first conduit, said housing being so disposed that the axis of said first conduit and the axis of said second conduit are substantially horizontally disposed, a source of irrigation water communicating under pressure with the other end of said second conduit and expanding said second conduit, a riser conduit communicating with said first conduit, said first and second conduits being disposed in a trench in the earth below ground level, a supporting arch comprising soil and a soil hardening agent conforming to the upper surface of said first and second conduits being disposed on said first and second conduits in said trench, the remainder of said trench above said arch being filled with earth, a riser housing communicating with said first conduit, said riser conduit and said riser housing extending vertically from said first conduit, a valve assembly comprising means in said riser conduit and in said riser housing near their bottom ends for opening said riser conduit in response to pressure in the first and second conduits above a predetermined superatmospheric pressure and closing said riser conduit in response to a pressure below said pressure in said conduits thereby maintaining said collapsible conduit in an expanded condition.

2. The system of claim 1 wherein said collapsible conduit is a polyethylene conduit.

3. An irrigation system comprising, in combination, a rigid housing having a first conduit therethrough of generally circular cross section, a collapsible second conduit of about the same circular cross section as said first conduit, means attaching one end of said second conduit to the wall of said first conduit, said housing being so disposed that the axis of said first conduit and the axis of said second conduit are substantially horizontally disposed, a source of irrigation water under pressure communicating with the other end of said second conduit and expanding said second conduit, a riser conduit communicating with said first conduit, said first and second conduits being disposed in a trench in the earth below ground level, a supporting arch comprising soil and a soil hardening agent conforming to the upper surface of said first and second conduits being disposed on said first and second conduits in said trench, the remainder of said trench above said arch being filled with earth, a riser housing communicating with said first conduit, said riser conduit and said riser housing extending vertically from said conduit, a valve assembly in said riser conduit and said riser housing near their bottom ends, said valve assembly comprising a valve seat supported in said riser conduit, a valve movable upwardly to seat against said seat, a valve stem supporting said valve, a pivot arm pivoted at one end to said valve stem, a pivot supporting said pivot arm intermediate its ends, a piston within and slidably fitting said riser housing, a piston rod pivoted at one end to the other end of said pivot arm and attached at its other end to said piston, a compression spring biasing said piston downwardly and said valve closed, and a manually operable means in the upper end of said riser housing for adjusting the compression of said spring, said spring being so selected and said manually operable means being so adjusted with respect to the compression of said spring that a pressure of from about 6 to 7 pounds above atmospheric is required to open said valve whereby at least said about 6 to 7 pounds' pressure is maintained in said collapsible conduit thereby eliminating any tendency of said collapsible conduit to collapse.

4. The conduit system of claim 3 wherein the area of said piston is greater than the area of said valve and the respective areas of said valve and said piston are such that said valve will open when the force exerted upward against the underside of said piston is greater than the combined force exerted upward against said valve and the downward force exerted by said compression spring, and are such that said valve will close when the force exerted upward against the underside of said piston is less than the combined force exerted upward against said valve and the downward force exerted by said compression spring.

5. An irrigation conduit system comprising, in combination, a rigid housing having a first conduit therethrough of generally circular cross section, a collapsible second conduit of about the same circular cross section as said first conduit, means attaching one end of said second conduit to the wall of said first conduit, a pipe surrounding said second conduit, a source of irrigation water under pressure communicating with the other end of said second conduit, a riser conduit communicating with said first conduit, a riser housing communicating with said first conduit, said riser conduit and said riser housing extending vertically from said first conduit, a valve assembly in said riser conduit and said riser housing near their bottom ends for opening and closing said riser conduit to the flow of water, said valve assembly comprising means in said riser conduit and in said riser housing near their bottom ends for opening said riser conduit in response to pressure in the first and second conduits above a predetermined super-atmospheric pressure and closing said riser conduit in response to a pressure below said pressure in said conduits thereby maintaining said collapsible conduit in an expanded condition.

6. An irrigation conduit system comprising, in combination, a rigid housing having a first conduit therethrough of generally circular cross section, a collapsible second conduit of about the same circular cross section as said first conduit, means attaching one end of said second conduit to the wall of said first conduit, a pipe surrounding said second conduit, a source of irrigation water under pressure communicating with the other end of said second conduit, a riser conduit connected with said first conduit, a riser housing connected separately with said first conduit, said riser conduit and said riser housing extending vertically from said first conduit, a valve assembly in said riser conduit and said riser housing near their bottom ends for opening and closing said riser conduit to the flow of water, said valve assembly comprising means in said riser conduit and in said riser housing near their bottom ends for opening said riser conduit in response to pressure in the first and second conduits above a predetermined superatmospheric pressure and closing said riser conduit in response to a pressure below said pressure in said conduits thereby maintaining said collapsible conduit in an expanded condition.

References Cited in the file of this patent

UNITED STATES PATENTS

| | | |
|---|---|---|
| 875,347 | Harris | Dec. 31, 1907 |
| 964,001 | Dissosway | July 12, 1910 |
| 1,130,282 | Heacock | Mar. 2, 1915 |
| 1,276,752 | Goodall | Aug. 27, 1918 |
| 1,277,332 | McNutt | Aug. 27, 1918 |
| 1,389,319 | Quigley | Aug. 30, 1921 |
| 1,758,941 | Gibson | May 20, 1930 |
| 2,007,969 | Grodsky | July 16, 1935 |
| 2,456,400 | Giannopulos | Dec. 14, 1948 |
| 2,595,408 | Quest | May 6, 1952 |
| 2,646,070 | Holland | July 21, 1953 |
| 2,718,684 | Bjorksten | Sept. 27, 1955 |
| 2,881,788 | Johnson | Apr. 14, 1959 |
| 2,891,570 | Krupp | June 23, 1959 |
| 2,972,968 | Stafford | Feb. 28, 1961 |

FOREIGN PATENTS

| | | |
|---|---|---|
| 80,728 | Denmark | Mar. 5, 1956 |